(12) United States Patent
Rini

(10) Patent No.: US 11,110,816 B2
(45) Date of Patent: Sep. 7, 2021

(54) CONDITION BASED MAINTENANCE (CBM) OF A VEHICLE PRIMARY ELECTRICAL SYSTEM

(71) Applicant: Guy Thomas Rini, Shepherdstown, WV (US)

(72) Inventor: Guy Thomas Rini, Shepherdstown, WV (US)

(73) Assignee: Guy Thomas Rini, Shepherdstown, WV (US)

( * ) Notice: Subject to any disclaimer, the term of this patent is extended or adjusted under 35 U.S.C. 154(b) by 176 days.

(21) Appl. No.: 16/573,269

(22) Filed: Sep. 17, 2019

(65) Prior Publication Data

US 2020/0086760 A1    Mar. 19, 2020

Related U.S. Application Data

(60) Provisional application No. 62/732,971, filed on Sep. 18, 2018.

(51) Int. Cl.
*B60L 58/16* (2019.01)
*B60L 53/62* (2019.01)
*B60L 58/13* (2019.01)

(52) U.S. Cl.
CPC .............. *B60L 58/16* (2019.02); *B60L 53/62* (2019.02); *B60L 58/13* (2019.02)

(58) Field of Classification Search
CPC ........... B60L 58/16; B60L 53/62; B60L 58/13
USPC ........................................................ 320/132
See application file for complete search history.

(56) References Cited

U.S. PATENT DOCUMENTS

| 6,417,668 | B1* | 7/2002 | Howard | H02J 7/1461 324/426 |
| 6,424,157 | B1* | 7/2002 | Gollomp | B60L 58/12 324/430 |
| 10,569,660 | B2* | 2/2020 | Lee | B60L 58/24 |
| 10,620,273 | B2* | 4/2020 | Tang | G01R 31/3648 |
| 10,749,362 | B2* | 8/2020 | Toya | H02J 7/0047 |
| 2005/0225301 | A1* | 10/2005 | Arnold | G01R 31/392 320/150 |
| 2009/0027056 | A1* | 1/2009 | Huang | G01R 31/389 324/439 |
| 2012/0265397 | A1* | 10/2012 | Aliberti | B60L 58/10 701/34.4 |
| 2013/0091083 | A1* | 4/2013 | Frisch | G01R 31/392 706/14 |

(Continued)

*Primary Examiner* — Suresh Memula
(74) *Attorney, Agent, or Firm* — Anova Law Group, PLLC

(57) ABSTRACT

A condition-based maintenance method is provided for a primary electrical system of a vehicle. The method includes obtaining a plurality of expected parametric values representing a state-of-health (SOH) of the primary electrical system of the vehicle; starting a series of operations to exercise a plurality of operating modes of the vehicle; continuously reading a plurality of voltage values from a battery voltage output of a diagnostic connector of the vehicle, performing analysis on the plurality of voltages values to generate current parametric values of SOH of the primary electrical system; based on comparison between the expected parametric values and the current parametric values, determining whether a condition-based maintenance is required; and, after determining that a condition-based maintenance is required, present a maintenance alert to an operator of the vehicle.

14 Claims, 3 Drawing Sheets

(56) References Cited

U.S. PATENT DOCUMENTS

| | | | |
|---|---|---|---|
| 2016/0064979 A1* | 3/2016 | Huang | H02J 7/0029 |
| | | | 320/114 |
| 2016/0363630 A1* | 12/2016 | Laskowsky | G01R 31/382 |
| 2016/0363631 A1* | 12/2016 | Frost | H01M 10/48 |
| 2017/0047745 A1* | 2/2017 | Chambon | H02J 7/0047 |
| 2018/0217208 A1* | 8/2018 | Park | G01R 31/3648 |
| 2018/0236890 A1* | 8/2018 | Cyrne | B60L 58/12 |
| 2018/0364312 A1* | 12/2018 | Jiang | G01R 31/392 |
| 2019/0170827 A1* | 6/2019 | Shoa Hassani Lashidani | |
| | | | H02J 7/0068 |
| 2019/0178943 A1* | 6/2019 | Lih | G01R 31/3842 |
| 2020/0386820 A1* | 12/2020 | Harper | G01R 31/374 |

* cited by examiner

CONDITION BASED MAINTENANCE (CBM) OF A VEHICLE PRIMARY ELECTRICAL SYSTEM

RELATED APPLICATION

This application claims priority to U.S. Provisional Patent Application No. 62/732,971, filed on Sep. 18, 2018, content of which is incorporated by reference in its entirety.

FIELD OF THE TECHNOLOGY

This application relates to the field of vehicle technologies and, specifically, to methods and systems for condition-based maintenance (CBM) of a vehicle primary electrical system.

BACKGROUND

The medium and heavy-duty vehicle markets have traditionally used two types of maintenance practices for maintaining vehicle electrical systems. One method is to provide corrective maintenance (CM) when a failure occurs. This is first evidenced by an outward sign that the system is not performing properly (e.g., engine does not start, dim lights, etc.). In some cases, on-board electronic systems perform electrical system functionality checks by monitoring voltages and currents. Anomalies with these parameters create active faults within the system triggering a "fault light" alerting the driver maintenance is needed and also recording fault data electronically as an aid for technicians to diagnose the faults.

Such monitoring is to alert the owner operator, or fleet or maintenance provider that corrective maintenance is necessary. While this may work effectively, it does not provide any advance alert or prognostic information. The monitoring simply provides an alert that maintenance is required at the present time. In some cases, the fault results in a vehicle being taken out of service or functionally disabled, which might require the vehicle to be towed or subject to on-site road service.

Another method is to do preventive maintenance (PM) on a predefined schedule of mileage or vehicle operating hours. The owner operators, fleets or maintenance providers that keep historical vehicle maintenance records can predict potential product failures based on the mileage or operating hours. In this case, the maintenance is scheduled before a fault occurs. Repair, replacement of components, or cleaning of electrical terminals "re-sets" the vehicle system back to like-new conditions. This preempts road breakdowns and the interrupts of normal operation when a failure occurs. While this procedure may work effectively at keeping a vehicle in service, it does have a higher cost, doing more maintenance than required.

According to the present disclosure, to solve the above issues, the condition-based maintenance (CBM) may be an optimal-level vehicle maintenance, and performed at a proper time. It is based on using real-time data and statistical data to prioritize and optimize maintenance resources. CBM algorithms determine the state of health (SOH) of components and sets alerts only when maintenance is necessary.

The present disclosure provides the CBM concept to the full level of implementation for vehicle electrical systems, and utilizes CBM to monitor electrical system health using prognostics methods to analyze real time data in relationship to the entire vehicle electrical system. This approach may effectively reduce the number of vehicles coming in for maintenance to only those that truly need service, thus reducing CM and PM practices and their associated costs. Repairs are only done when warranted.

SUMMARY

One aspect of the present disclosure includes a condition-based maintenance method for a primary electrical system of a vehicle, which includes an engine. The method includes obtaining a plurality of expected parametric values representing a state-of-health (SOH) of the primary electrical system of the vehicle; starting a series of operations to exercise a plurality of operating modes of the vehicle; and continuously reading a plurality of voltage values from a battery voltage output of a diagnostic connector of the vehicle. The voltage values represent battery voltages during the plurality of operating modes, and the primary electrical system includes at least a battery, a starter, a key, an alternator, and a cable connecting battery terminals to a battery voltage output of a diagnostic connector. The method also includes performing analysis on the plurality of voltages values to generate current parametric values of SOH of the primary electrical system; based on comparison between the expected parametric values and the current parametric values, determining whether a condition-based maintenance is required; and, after determining that a condition-based maintenance is required, present a maintenance alert to an operator of the vehicle.

Another aspect of the present disclosure includes a condition-based maintenance system for a vehicle having an engine. The system includes a diagnostic connector; a computer coupled to the diagnostic connector via a programming adaptor; and a primary electrical system including at least a battery, a starter, a key, an alternator, and a cable connecting battery terminals to a battery voltage output of a diagnostic connector. The computer is configured to perform: obtaining a plurality of expected parametric values representing a state-of-health (SOH) of the primary electrical system of the vehicle; starting a series of operations to exercise a plurality of operating modes of the vehicle; continuously reading a plurality of voltage values from the battery voltage output of the diagnostic connector of the vehicle, wherein the voltage values represent battery voltages during the plurality of operating modes; performing analysis on the plurality of voltages values to generate current parametric values of SOH of the primary electrical system, wherein the performing analysis includes at least performing temperature compensation for the battery and the cable; based on comparison between the expected parametric values and the current parametric values, determining whether a condition-based maintenance is required; and after determining that a condition-based maintenance is required, present a maintenance alert to an operator of the vehicle.

Other aspects of the present disclosure can be understood by those skilled in the art in light of the description, the claims, and the drawings of the present disclosure.

DETAILED DESCRIPTION

The following describes the technical solutions in the embodiments of the present invention with reference to the accompanying drawings. Apparently, the described embodiments are merely some but not all the embodiments of the present invention. Other embodiments obtained by a person skilled in the art based on the embodiments of the present invention without creative efforts shall fall within the protection scope of the present disclosure.

Figure 1:
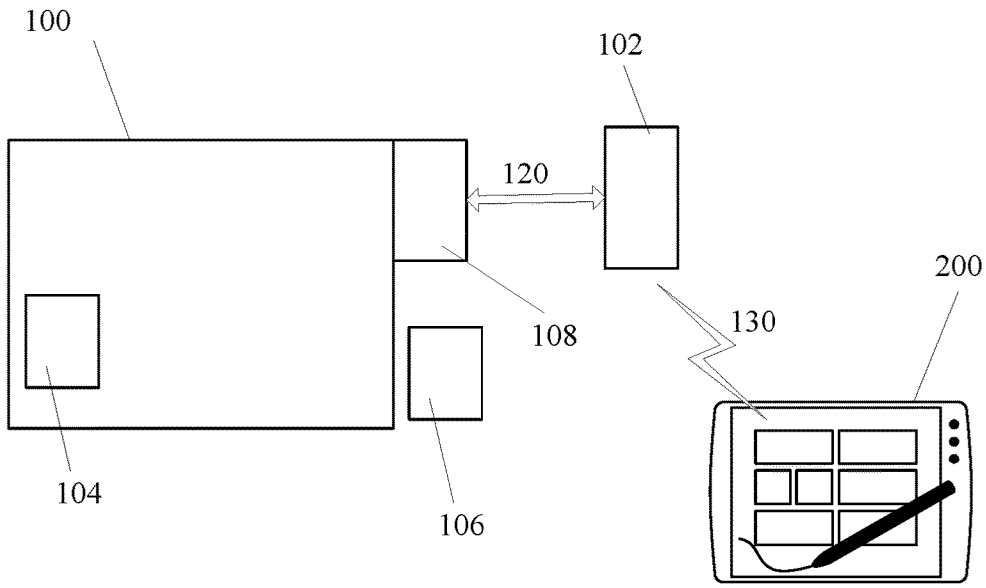
FIG. 1 illustrates an operating environment incorporating certain embodiments of the present disclosure.

FIG. 1 shows an exemplary operating environment incorporating certain embodiments of the present disclosure. As shown in FIG. 1, a vehicle 100 is provided, which may include any appropriate mobile machine designed to transport passengers or cargo over land, sea, and air. Vehicle 100 may include an engine (not shown), electrical systems (not shown), and various modules for driving, navigation, and control (not shown), etc. The engine may provide power to the vehicle 100, and the electrical systems consisting of several electrical devices.

Various modules and components in vehicle 100 may be connected via a vehicle network, such as a control area network (CAN), e.g., SAE J1939, OBD II (not shown). Vehicle 100 may include a data connector or a diagnostic connector 108, such as a J1939 connector, such that vehicle data may be captured off of the vehicle network.

In one embodiment, a condition-based maintenance (CBM) may be implemented using the data from the diagnostic connector 108. To perform CBM, the only connection to the vehicle may be through the diagnostic connector 108 (e.g., J1939 connector). The diagnostic connector 108 may meet industry standards for direct interface with the diagnostic port supplied by the vehicle OEM.

A programming adaptor 102 may be connected to the diagnostic connector 108 through a connection 120. The connection 120 may include any appropriate connection, such as a J1939 cable or a wireless connection. The adaptor 102 may be designed to meet industry standards (e.g., RP1210). The adaptor 102 monitors (samples) certain pins or data terminals from the diagnostic connector 108 (e.g., Power, Ground, etc.) continuously, such that the electrical waveforms of the data (e.g., Power and Ground) from the diagnostic connector 108 can be accurately analyzed, for example, similar to that of an oscilloscope. The other input at the connector 108 may be the CAN data, which may include broadcast data on the CAN network and/or specific data requested over the CAN network.

Figure 2:
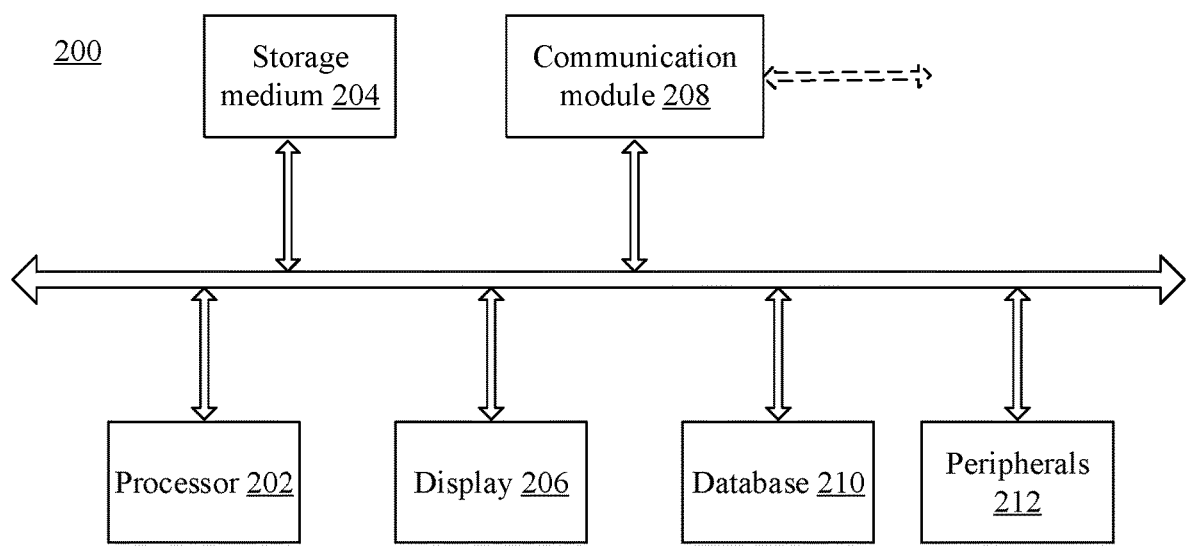
FIG. 2 illustrates an exemplary computer system according to embodiments of the present disclosure.

Further, a computer 200 may be provided to connect with the programming adaptor 102 through a connection 130. The connection 130 may include any appropriate wired or wireless connection, such as a cable or a Bluetooth connection. The computer 200 may be a portable computer, a tablet computer, a laptop computer, a smartphone, or the like. FIG. 2 illustrates an exemplary computer 200.

As shown in FIG. 2, computer 200 may include a processor 202, a storage medium 204, a display 206, a communication module 208, a database 210, and peripherals 212. Certain devices may be omitted, and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Display 206 may include any appropriate display device configured to display certain information to an operator of the vehicle. Further, peripherals 212 may include various sensors, such as temperature sensors, and other I/O devices, such as current, voltage, and other vehicular parameter inputs and outputs. The communication module 208 may include certain network interface devices for establishing connections through communication networks. Database 210 may include one or more databases for storing certain data and for performing certain CBM operations.

In certain other embodiments, a separate on-board monitor module 106 (e.g., a E-Track module) may be coupled to the diagnostic connector 108 to obtain the data from the diagnostic connector 108 or from the vehicle network directly and may perform the various functionalities of the programming adaptor 102 and the computer 200 to implement the CBM operations.

In certain other embodiments, an ECU 104 may be coupled to the vehicle network and obtains the data from the vehicle network and perform various functionalities on the computer 200 to implement the CBM operations.

Figure 3:
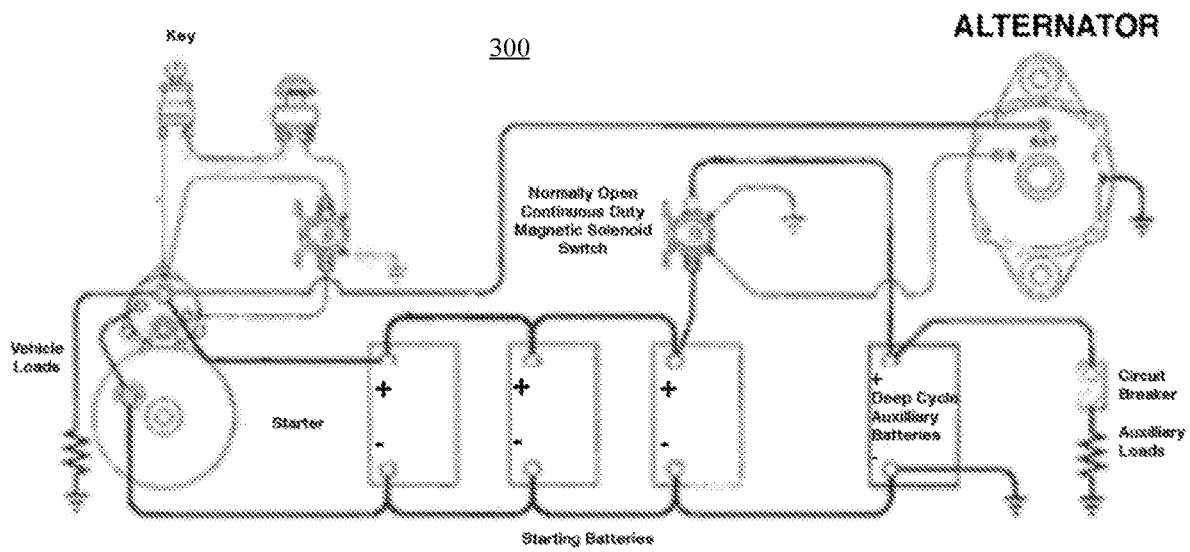
FIG. 3 illustrates a vehicle primary electrical system according to embodiments of the present disclosure.

The CBM operations may be based on signals from the electrical system of vehicle 100. FIG. 3 illustrates an exemplary primary electrical system 300 consistent with the disclosed embodiments of the present disclosure.

As shown in FIG. 3, the primary electrical system 300 include a key, a starter, vehicle loads, a starting battery or batteries, a normally open continuous duty magnetic solenoid switch, an alternator, a deep cycle auxiliary battery or batteries, a circuit breaker, and auxiliary loads. A cable connecting the terminals of the battery or batteries to the diagnostic connector 108, or its equivalent conducting connection, may also be included such that the batter voltages can be read from the diagnostic connector 108. Certain devices may be omitted, and other devices may be added.

In one embodiment, vehicle 100 may be a heavy truck, and the primary electrical system 300 may be representative of a typical heavy-duty configuration with starting and deep cycle batteries. The normally open solenoid switch keeps the two battery types separated when the engine is off or the alternator output is low, and closes when the alternator output is high enough to charge the batteries.

The disclosed CBM method may be based on the state of health (SOH) of the primary electrical system by applying circuit analysis (e.g., including statistical analysis) of battery voltages. Lead acid (Pb-Acid) batteries are the most commonly used on ground vehicles. There are millions of vehicles in use today using Pb-Acid batteries. There are three basic types: wet cell (flooded), absorption glass mat (AGM), and gel-cell. Batteries are further categorized by the intended applications. Starting batteries are designed to provide high current surges for short durations. Starting batteries should be kept fully charged between cycles to prevent sulfation and desulfaction. Deep Cycle batteries are designed for applications where such batteries are regularly discharged, and deliver less peak current than flooded batteries but are capable of withstanding regular discharging to low voltage levels.

Figure 4:
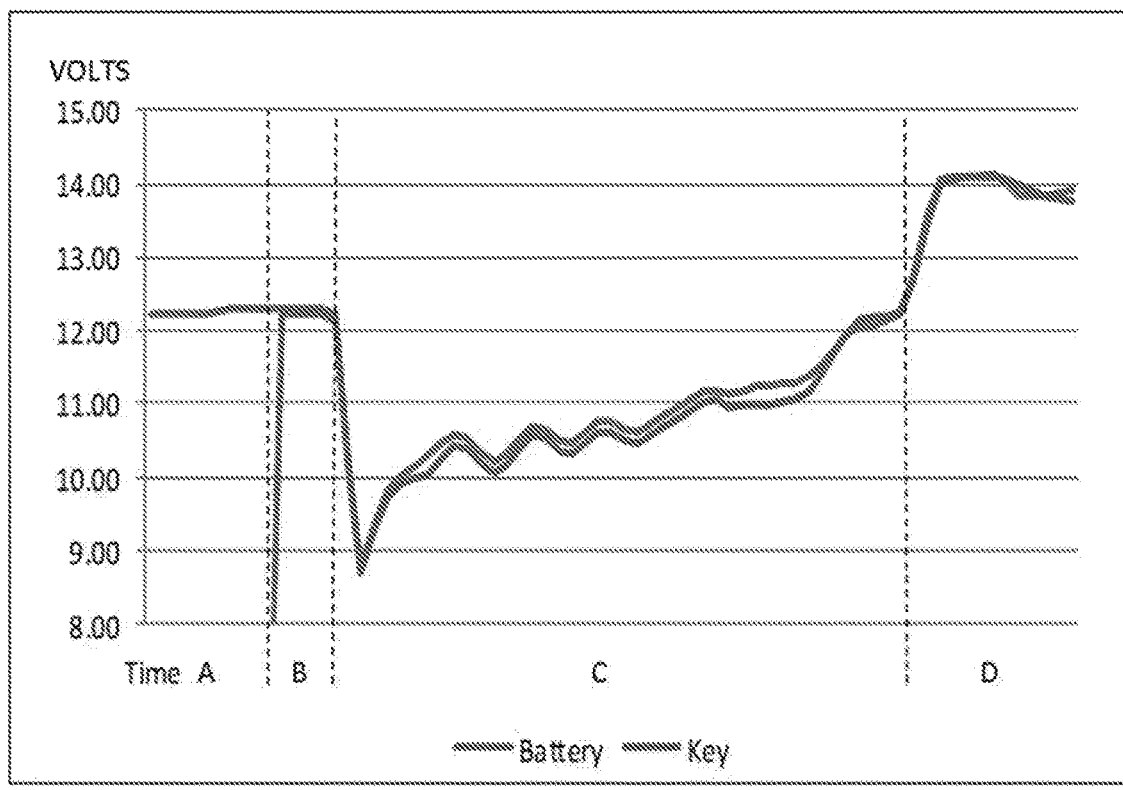
FIG. 4 illustrates operation modes of a vehicle primary electrical system according to embodiments of the present disclosure.

By monitoring the batteries, various modes of operation of vehicle 100 may be determined and analyzed. FIG. 4 illustrates four basic modes of operation as seen from the battery.

As shown in FIG. 4, four operating modes A, B, C, and D are separated in time, and defined by the battery states, such as Key Off, Key On, Start Cycle, Alternator Output, in series. Each operating mode may have a unique identity that is used for doing circuit analysis.

A: Key OFF Mode. With the key off, the internal combustion engine (ICE) is off (not running) and there is no alternator output. Some applications require electrical load for electronic equipment operate under key off conditions. This would include systems like anti-theft or telematics systems. On vehicles requiring more electrical power, an auxiliary battery may be used to allow the starting battery to be in its most relaxed state. In the key OFF state, the battery voltage is closes to the open circuit voltage (OCV).

B: Key ON and Engine OFF Mode. In this state of operation, the battery powers many electrical systems that are configured to be on automatically or switched on by the operator. When the transition from Key OFF to Key ON is made, the battery voltage drops in as a result of the loads.

C: Start Cycle Mode. The characteristics of the start cycle are easily identified. There is a significant power surge that begins when the magnetic starter switch pulls in. The battery voltage may drop significantly. The waveform is easily identified as being a start cycle. At the end of the start cycle, voltage begin to recover relatively quickly even if the engine does not start.

D: Alternator Output Mode. The alternator output can only be present with the Key ON and engine running. The voltage at the battery is elevated above the level it was in the previous Key OFF state. For example, the alternator output is regulated at 14.1 volts or more for 12-volt systems and 28.2 volts or more for a 24-volt system. This charges the battery and causes the terminal voltage to rise as the battery charges. Under the fully-charged condition, the terminal voltage may exceed the 100% state of charge level because of surface charging.

Returning to FIG. 1, for illustrative purposes, operations with the configuration of the programming adaptor 102 and the computer 200 is discussed in detail in the following sections, but other configurations may also be used.

Specifically, during operation, computer 200 may run certain CBM software programs to implement the CBM operations based on signals received through the programming adaptor 102. For example, computer 200 may have a screen-driven story board that instructs a technician to perform certain tests in certain sequences, such as to turn the key ON and OFF and rev up the engine in a subscribed manner such that each of the four operating modes is exercised. The data extracted by the programming adaptor 102 is run through the embedded CBM algorithms. The state of heath analysis may be then performed on the computer 200. After completing the analytic and statistical analysis, computer 200 may present the diagnostic results to report the primary electrical system health.

Figure 5:
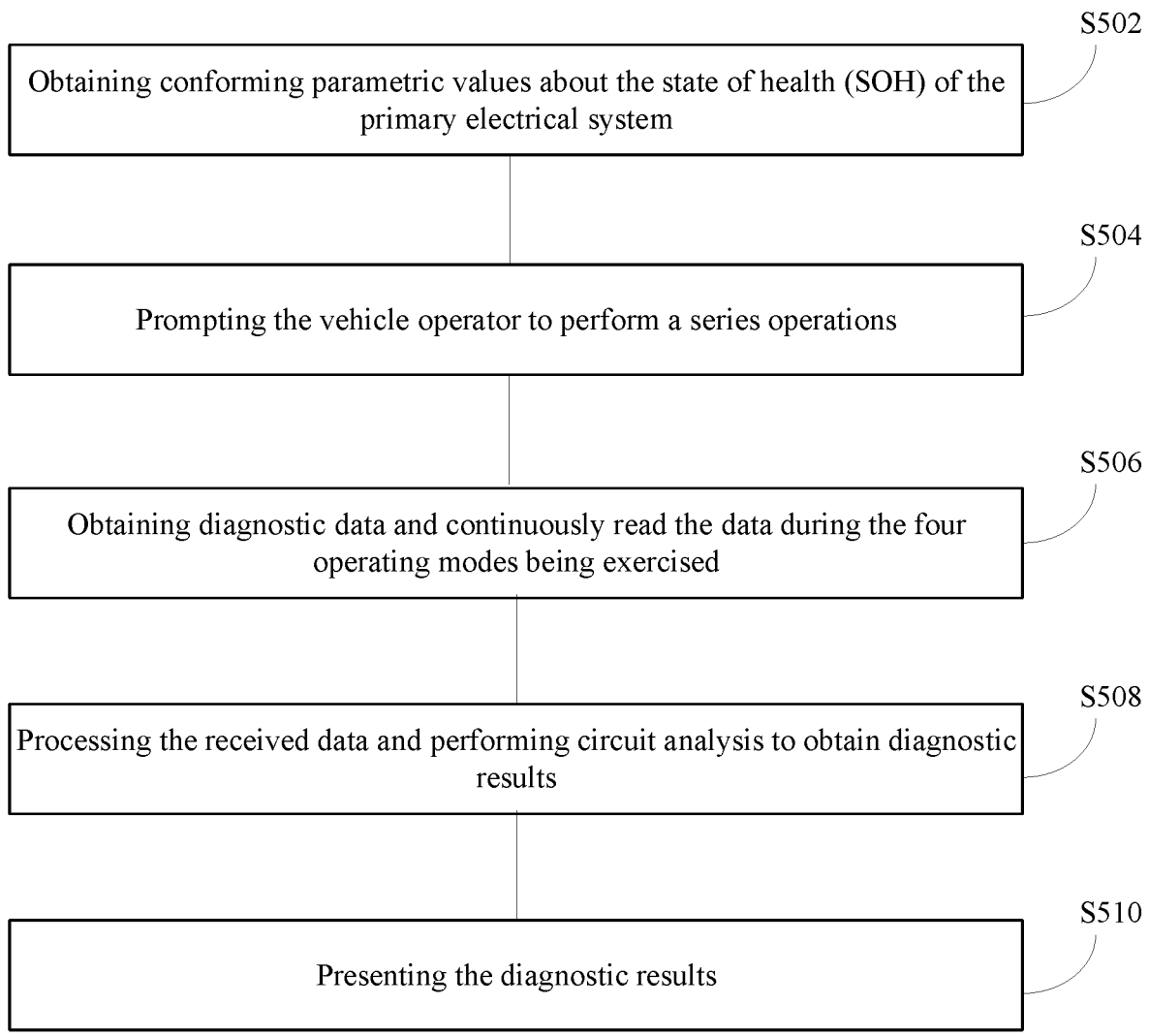
FIG. 5 illustrates an exemplary CBM method according to embodiments of the present disclosure.

In certain embodiments, the circuit measurements and diagnostics are performed on the PES components (batteries, cables, starter, and alternator) with only one analog input, i.e., the battery voltage. Monitoring of the other components is inferred through analytic methods to determine the operating modes and condition of the other components. Once the operation mode is identified, the circuit analysis can be performed. Values of parameters (some inferred, measured or calculated) can be compared with expected values and limits. Further, historical records can be stored and may be beneficial for evaluation using statistical methods. FIG. 5 illustrates an exemplary CBM method consistent with the disclosed embodiments of the present disclosure.

As shown in FIG. 5, at beginning, expected parametric values may be obtained about the state of health (SOH) of the primary electrical system (S502). The SOH of the primary electrical system may be determined by applying circuit analysis of statistical analysis of battery voltages in the different modes. That is, the parametric values of the battery voltages in the different modes may represent the SOH of the primary electrical system. The expected parametric values may thus include desired parametric values of the battery voltages in the different modes that represent an acceptable SOH of the primary electrical system.

An assumption is that the parametric values of a new system are at 100% SOH. Vehicles are built to known specification with approved components that meet the intended quality standards set by the manufacturers. Once a vehicle has passed final inspection and/or end of line testing, it is put into service. Normal operation is expected for hundreds and even thousands of daily cycles. If, in fact, the starting and charging systems operate satisfactorily for the end user on a daily basis, then the SOH of each parametric value is scaled to 100 percent.

Accordingly, computer 200 may obtain the expected parametric values of battery voltages in the different operating modes on a new system or a new vehicle in advance and store the values for later analysis for later retrieval. Computer 200 may also obtain the expected parametric values from a database, or from a maintenance server in real time. In one embodiment, the expected parametric values may be set as a 100% SOH, or may be set as a threshold from 100% SOH, such as approximately 90% SOH, or 80% SOH, etc.

After obtaining the expected parametric values, computer 200 may prompt the operator to perform a series operations (S504). For example, computer 200 may prompt the vehicle operator to perform a series of operations, such as turning the key ON and OFF and revving up the engine in a subscribed manner such that each of the four operating modes is exercised. In one embodiment, the series of operations may be performed in a sequence, Key OFF, Key On, Start Cycle, and Alternator Output, etc. Other operations may also be included.

That is, all of the four operating modes may be exercised. During these operating modes, data from the vehicle diagnostic connector 108 can be obtained by the programming adaptor 102, and computer 200 may continuously read the data (e.g., battery voltages) during the four operating modes being exercised (S506). The data may include any specific requested data or broadcast data on the vehicle network (e.g., CAN network), such as battery voltage, ambient temperature, engine coolant temperature, vehicle operating parameters and other application specific parameters.

In one embodiment, the four operating modes are identified only by continuous monitoring the battery voltage (shown in FIG. 4). The key voltage (the voltage of the key shown in FIG. 4) is not monitored. Thus, this may eliminate wiring and may also allow for the entire analysis to be done through the diagnostic connector 108. This approach simplifies the diagnostic session on computer 200 by not requiring a connection to the key, and all the data is captured off of the vehicle network (i.e. SAE J1939, OBD II).

Further, computer 200 may process the received data (e.g., voltage data) and perform circuit analysis to obtain diagnostic results (S508). For example, computer 200 may generate a snapshot and rolling average of battery voltage that begins before the Key-ON event and lasts until after the Start-Cycle event. Typically, the snapshot is several seconds in duration. It starts seconds before the key-ON event and continues until after a normal start. The resolution has to be great enough to resolve the start waveform as depicted in FIG. 4. This may require multiple samples per second. That is, the data on the diagnostic connector 108 may be read or requested at this desired CBM resolution. In other words, based on the received data, the computer 200 may identify the four operating modes and may then calculate the battery voltages of the operating modes, which may be a snapshot of the battery voltage or average battery voltage or both, of each of the operating modes.

Based on the received data and the processed data (e.g., snapshot and average of battery voltages), computer 200 may perform analysis to determine the SOH of the primary electrical system. That is, computer 200 may determine the current parametric values of the primary electrical system (e.g., snapshot and average of battery voltages of at least one of the operating modes or each of the operating modes). The analysis that determines the electrical system SOH may also have several parts relative to circuit analysis.

For example, one part is to consider or recognize that every start cycle is affected by component temperatures and intrinsic resistivity. Battery resistivity has a negative coefficient based on the electro-chemistry while electrical cables and starters have a positive coefficient based on the copper wire. Thus, these factors may need to be taken into account in performing the analysis and the data may need to be compensated based these factors.

Every start cycle can be used for the SOH calculation by taking into account the temperature of components. Pd-Acid batteries have a negative coefficient of resistivity (resistance decreases with increasing temperature). Copper cables and starter windings have a positive coefficient (resistance increases with increasing temperature). Thus, the temperature of every component considered needs to be compensated in the analysis.

For example, the data needs to be adjusted based on the temperatures of relevant components with respect to a base temperature used for CBM, such as 20 degrees C. That is, the expected parametric values (or expected parametric values) are taken at the base temperature, i.e., the baseline data. If the expected parametric values are not taken at the base temperature, the expected parametric values may be adjusted to the base temperature first.

By compensating for temperature, the analyzed values can be estimated and compared with baseline data. Typically, the first start after a long period of rest (Key OFF) provides the best accuracy. This is because all component temperatures are at or near to the ambient temperature. In this case, all relevant components are compensated based on the ambient temperature and the base temperature. As described above, the ambient temperature, coolant temperature, and vehicle operating temperature may be read through the diagnostic connector 108 during operations.

After some running time, the ambient temperature may be rising, and the components may also be impacted by the coolant temperature and/or vehicle operating temperature. When the coolant temperature is above the ambient temperature, a different temperature may be used to compensate the temperature for the Start Cycle. The different temperature may be the coolant temperature, or may be a new temperature based on both the ambient temperature and the coolant temperature, such as an average of the two temperatures.

The analysis may be based on actual circuity and data acquisition methods. For example, when reading the voltage data of the battery from the diagnostic connector 108 (by computer 200 through the programming connector 102) during different operating modes, the voltages are measured through circuit loops, which includes some common components (such as battery and cable) and some different components (such as alternator) for during different operating modes. The data from the diagnostic connector 108 may then be adjusted to compensate the temperature and other factors to be considered.

For example, a negative coefficient of resistivity of the battery may be used to compensate the data to the base temperature, and a positive coefficient of resistivity of the connection cable or windings may be used to compensate the data to the base temperature.

Further, another part in the analysis may include the inductance of the starter, which may also play a part in doing the analysis. The inductance is calculated by the rate of change of the current during the initial portions of the start cycle. The processed data of the start cycle may also be compensated for the inductance.

After adjustment for compensations of temperature and other factors, such as inductance), the adjusted current parametric values (snapshot and/or average battery voltages during the four operating modes or during a specific operating mode such as Start Cycle) may be compared with the expected parametric values. The adjusted parametric values may be each of the operating modes or may be at least one of the operating modes. If the adjusted parametric values do not match the expected parametric values (e.g., not within the range set by the expected parametric values), computer 200 may determine that a condition-based maintenance is required. Otherwise, computer 200 may determine that a condition-based maintenance is not required at current time.

Optionally or additionally, computer 200 may also perform a statistical analysis to determine whether a condition-based maintenance is required and/or an SOH trend to provide further recommendation on when a condition-based maintenance is required. The statistical analysis may be based on several data distributions, such as vehicle historical data, fleet data, and/or big data, etc.

For example, vehicle historical data may be collected and stored in advance, and computer 200 may obtain the vehicle historical data from a database or a server. The vehicle historical data may provide data relative to the SOH of the vehicle being monitored, including SOH readings and maintenance records. If computer 200 determines that the adjusted parametric values are close to or within the range of the SOH readings associated with recorded maintenance, computer 200 may determine that a condition-based maintenance is required. Such analysis may be performed in addition to comparison to the expected parametric values. For example, even when the adjusted parametric values are within the range of the expected parametric values, if the historical data shows a maintenance was performed under such SOH readings, computer 200 may determine that a condition-based maintenance is required.

Further, the SOH for each component decreases over time, and may be affected by the number of cycles, hours of service and environment. By comparing the adjusted parametric values (i.e., the current SOH reading) with historical data, computer 200 may determine a trend of CBM of this specific vehicle, and may recommend a subsequent condition-based maintenance in the near future or may set alerts for low SOH values meaning the component is nearing end of useful life.

Further, fleet data may also be obtained by computer 200 for analysis. The fleet data allows for comparison of similar vehicles with similar duty cycles. Larger fleets typically buy multiple vehicles with identical specifications. The distribution of data in fleets is useful in identifying statistical outliers or components with poor SOH. That is, the vehicle historical data of identical vehicles in the fleet may be used instead of or in addition to the vehicle historical data of the specific vehicle, which may provide a more reliable averaged estimation of SOH of the electrical system.

Further, computer 200 may obtain more broad data, i.e., big data. The big data is the comparison of one fleet's data with another fleet's data. In addition to the vehicle historical data of identical vehicles, with big data, vehicle with common elements in the VIN numbers can be identified as having the same of similar electrical systems. The big data may be a service available through a cloud server to fleets or OEMs that share data. Computer 200 may obtain the big data from the cloud server during operation. The historical data of identical vehicles and/or vehicle with common elements may be used instead of or in addition to the vehicle historical data of the specific vehicle and/or of vehicles in the own fleet, which may provide a more reliable averaged estimation of SOH of the electrical system.

Certainly, other analysis and/or data can also be used. At the completion of the analysis, computer 200 may determine whether a condition-based maintenance is required at current time, may also determine a trend of condition-based maintenance for the vehicle, and may also recommend a future condition-based maintenance based on the trend.

Returning to FIG. 5, after obtaining the analysis results, computer 200 may further present the diagnostic results (S510). For example, computer 200 may prompt CBM alerts on the screen for the operator, or may send the CBM alerts to the operator through text messages or emails, or may also send the CBM alerts to fleet maintenance server or other computer systems.

Accordingly, the disclosed CBM methods and systems can provide CBM alerts by monitoring the vehicle electrical system and analyzing trends as components wear and/or system performance deteriorates. The maintenance alerts are established by applying prognostic algorithms comparing real time data to historic data and identify a trend. Such approach can reduce maintenance effort in time and cost of maintaining a primary electrical system in service. It combines circuit analysis and Testing for Statistical Significance (TSS) to qualify the State of Health (SOH) of primary electrical system components (batteries, alternator, starter and electrical cables). Further, the CBM is accomplished without the use of conventional service shop equipment such as battery testers, alternator testers or by service equipment that check for corrosion and ground circuit continuity. Instead, this is accomplished be using data from the vehicle communication network, SAE J1939 or equivalent, real time monitoring of certain voltages, and inference techniques. Thus, unlike other test methods for electrical systems, the CBM analysis is accomplished without the vehicle being taken out of service for maintenance and without the addition of sensors.

By using the disclosed CBM methods and systems, input of battery (singular or in plurality, 12 or 24 volt system) voltage is monitored. This single input along with other data read off of the CAN bus is used to infer the operating modes. This data for each operating mode is compared with baseline data of the system under a normal condition. Maintenance alerts are then set based on the condition of each component. Aging and cycling of components (i.e., battery, starter, alternator, etc.), abnormal wear or damage (i.e., wires chafing, shorting or breaking) and corrosion which result in a change in the voltage, current and resistance relationship are among those conditions that produce a maintenance alert. The vehicle can then be pulled for service for maintenance as specified by the vehicle OEM or standard diagnostic procedures, such as Technology Maintenance Council of the American Trucking Association (TMC) RP129A and RP139A (Battery, Cranking and Charging testing) can then be performed.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A condition-based maintenance method for a primary electrical system of a vehicle having an engine, comprising:
   obtaining a plurality of expected parametric values representing a state-of-health (SOH) of the primary electrical system of the vehicle;
   starting a series of operations to exercise a plurality of operating modes of the vehicle;
   continuously reading a plurality of voltage values from a battery voltage output of a diagnostic connector of the vehicle, wherein the voltage values represent battery voltages during the plurality of operating modes, and the primary electrical system includes at least a battery, a starter, a key, an alternator, and a cable connecting battery terminals to a battery voltage output of a diagnostic connector;
   performing analysis on the plurality of voltages values to generate current parametric values of SOH of the primary electrical system, wherein the performing analysis includes at least performing temperature compensation for the battery and the cable;
   based on comparison between the expected parametric values and the current parametric values, determining whether a condition-based maintenance is required; and
   after determining that a condition-based maintenance is required, present a maintenance alert to an operator of the vehicle.

2. The method according to claim 1, further comprising:
   performing a statistical analysis based on the current parametric values and at least one of historical data of the vehicle, fleet data of other vehicle identical to the vehicle in a same fleet as the vehicle, and big data of vehicles with common components with the vehicle in a different fleet than the vehicle;
   determining a maintenance trend of the vehicle based on the statistical analysis; and
   making a recommendation of a subsequent condition-based maintenance based on the maintenance trend.

3. The method according to claim 1, wherein the plurality of operating modes include:
   a key off mode, in which the key is off, the engine is off, and there is no alternator output;

a key on mode, in which the key is on, the engine is off, and the battery powers various components of the vehicle;

a start cycle mode, in which the key is on, and the starter is switched on to start the engine; and an alternator output mode, in which the key is on, the engine is on, and there is alternator output.

4. The method according to claim 3, wherein:

the current parametric values are battery voltage values of the battery during at least one of the plurality of operating modes; and the comparison includes the battery voltage values of the battery during at least one of the plurality of operating modes.

5. The method according to claim 3, wherein:

current parametric values are battery voltage values of the battery during each of the plurality of operating modes; and the comparison includes the battery voltage values of the battery during each of the plurality of operating modes.

6. The method according to claim 1, wherein the performing temperature compensation for the battery and the cable further includes:

reading an ambient temperature from the diagnostic connector;

compensating the battery from the ambient temperature to a base temperature using a negative coefficient of resistivity of the battery; and compensating the cable from the ambient temperature to the base temperature using a positive coefficient of resistivity of the cable.

7. The method according to claim 1, wherein the performing analysis further includes:

performing compensation on the voltages values of the start cycle mode by an inductance of the starter calculated by a rate of change of current during initial portions of the start cycle mode.

8. A condition-based maintenance system for a vehicle having an engine, comprising:

a diagnostic connector;

a computer coupled to the diagnostic connector via a programming adaptor; and a primary electrical system including at least a battery, a starter, a key, an alternator, and a cable connecting battery terminals to a battery voltage output of a diagnostic connector, wherein the computer is configured to perform:

obtaining a plurality of expected parametric values representing a state-of-health (SOH) of the primary electrical system of the vehicle;

starting a series of operations to exercise a plurality of operating modes of the vehicle;

continuously reading a plurality of voltage values from the battery voltage output of the diagnostic connector of the vehicle, wherein the voltage values represent battery voltages during the plurality of operating modes, performing analysis on the plurality of voltages values to generate current parametric values of SOH of the primary electrical system, wherein the performing analysis includes at least performing temperature compensation for the battery and the cable;

based on comparison between the expected parametric values and the current parametric values, determining whether a condition-based maintenance is required; and after determining that a condition-based maintenance is required, present a maintenance alert to an operator of the vehicle.

9. The system according to claim 8, wherein the computer is further configured to perform:

performing a statistical analysis based on the current parametric values and at least one of historical data of the vehicle, fleet data of other vehicle identical to the vehicle in a same fleet as the vehicle, and big data of vehicles with common components with the vehicle in a different fleet than the vehicle;

determining a maintenance trend of the vehicle based on the statistical analysis; and making a recommendation of a subsequent condition-based maintenance based on the maintenance trend.

10. The system according to claim 8, wherein the plurality of operating modes include:

a key off mode, in which the key is off, the engine is off, and there is no alternator output;

a key on mode, in which the key is on, the engine is off, and the battery powers various components of the vehicle;

a start cycle mode, in which the key is on, and the starter is switched on to start the engine; and an alternator output mode, in which the key is on, the engine is on, and there is alternator output.

11. The system according to claim 10, wherein:

the current parametric values are battery voltage values of the battery during at least one of the plurality of operating modes; and the comparison includes the battery voltage values of the battery during at least one of the plurality of operating modes.

12. The system according to claim 10, wherein:

current parametric values are battery voltage values of the battery during each of the plurality of operating modes; and the comparison includes the battery voltage values of the battery during each of the plurality of operating modes.

13. The system according to claim 8, wherein the performing temperature compensation for the battery and the cable further includes:

reading an ambient temperature from the diagnostic connector;

compensating the battery from the ambient temperature to a base temperature using a negative coefficient of resistivity of the battery; and compensating the cable from the ambient temperature to the base temperature using a positive coefficient of resistivity of the cable.

14. The system according to claim 8, wherein the performing analysis further includes:

performing compensation on the voltages values of the start cycle mode by an inductance of the starter calculated by a rate of change of current during initial portions of the start cycle mode.

* * * * *